United States Patent [19]

Kuhls et al.

[11] 4,058,578

[45] Nov. 15, 1977

[54] PROCESS FOR THE MANUFACTURE OF PASTE-EXTRUDABLE POLYMERS OF TETRAFLUOROETHYLENE

[75] Inventors: Jürgen Kuhls, Burghausen, Salzach; Thomas Martini, Neuenhain, Taunus; Alfred Steininger, Burgkirchen Alz, all of Germany

[73] Assignee: Hoechst Aktiengesellschaft, Germany

[21] Appl. No.: 727,643

[22] Filed: Sept. 29, 1976

[30] Foreign Application Priority Data

Oct. 2, 1975 Germany .............................. 2544040

[51] Int. Cl.² ...................... C08F 214/26; C08L 27/18
[52] U.S. Cl. .................................. 260/884; 260/340.6; 526/247; 526/249; 526/255; 264/176 R; 264/209; 264/272
[58] Field of Search ................ 260/884; 526/247, 255, 526/266

[56] References Cited
U.S. PATENT DOCUMENTS 2,186,359 1/1940 Britton et al. ..................... 526/266
3,704,285 11/1972 Porter ................................ 526/255
3,721,638 3/1973 Sianesi et al. ...................... 526/255
3,819,594 6/1974 Holmes et al. ..................... 526/255

Primary Examiner—Harry Wong, Jr.
Attorney, Agent, or Firm—Connolly and Hutz

[57] ABSTRACT

Modified tetrafluoroethylene dispersion polymers are prepared by polymerizing tetrafluoroethylene in the presence of perfluorinated vinyl ethers of the formula I

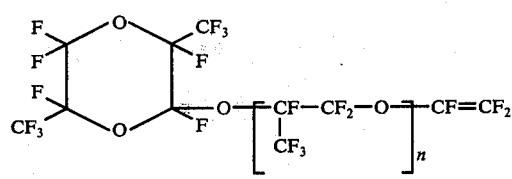

as modification agent. The articles made from the polymers by paste-extrusion have improved mechanical and electrical properties even if the extrusion is carried out at a high reduction ratio and draw-off rate.

13 Claims, No Drawings

PROCESS FOR THE MANUFACTURE OF PASTE-EXTRUDABLE POLYMERS OF TETRAFLUOROETHYLENE

This invention relates to a process for the manufacture of modified tetrafluoroethylene dispersion polymers by polymerizing tetrafluoroethylene in the presence of catalysts, dispersion agents and modification agents, optionally also in the presence of an aqueous seed dispersion.

It is known that polymers of tetrafluoroethylene can be obtained by two substantially different methods, i.e. by suspension polymerization coarse-grained polymers having an average particle size of about 20 to about 1000 microns are obtained, which, after drying and grinding or after a treatment to improve their flow properties, can be used for mold sintering or ram extrusion, and by dispersion polymerization whith the use of suitable emulsifiers stable aqueous polytetrafluoroethylene dispersions are obtained having a particle size of from about 0.05 to 0.6 micron which are especially suitable for impregnation and coating purposes. By mechanical coagulation and subsequent drying of the precipitated dispersion polymer flowable powders can be obtained. But these polytetrafluoroethylene powders obtained by dispersion polymerization are hardly suitable for the so-called paste extrusion technique according to which the polymer is first made into a paste by mixing with a liquid lubricant, for example a high boiling hydrocarbon, and the paste is then extruded under pressure through a die. The drawback resides in the fact that, owing to the lack of orientation of the material, the extruded article has a rough surface and knots are formed. In order to ensure a uniform extrusion and to avoid the aforesaid disadvantages, dispersions are wanted in which the particles substantially have an almost spherical shape. Moreover, it is desirable to reduce the high extrusion pressure required for the extrusion of dispersion polymers in paste form by modification of the polymer during polymerization.

Processes have already been described the aim of which is to improve the paste extrusion properties of dispersion polymers of tetrafluoroethylene. U.S. Pat. No. 3,088,941 proposes, for example, to carry out the dispersion polymerization of tetrafluoroethylene with the use of a seed dispersion of the tetrafluoroethylene homopolymer. The dispersion particles obtained have, however, a very broad particle size distribution, which is not desired. To overcome this drawback U.S. Pat. Specification 3,654,210 proposes to polymerize in the presence of seeds of dispersion copolymers of a predominant proportion of tetrafluoroethylene with fluoroolefins containing chlorine, bromine, iodine or hydrogen, especially trifluorochloroethylene.

In the two aforesaid processes, in the main polymerization, carried out after the preparation of the seeds, no modifying substances having a regulating effect or chain interrupting properties are used. It comes true that this is of advantage for the polymerization speed, since modifying additives reduce the space-time-yield because of their regulating effect. But, on the other hand, the processes with our modification in the main polymerization have the disadvantages that the polymers obtained have a higher melt viscosity and the extruded articles made therefrom, for example pipes and flexible tubes, have a reduced alternating bending strength, a poorer transparency and a higher brittleness. Moreover, products made from copolymers prepared in the presence of a seed dispersion exhibit a higher shrinkage in transverse direction on sintering, which detrimentally affects, for example, the dimensional accuracy of pipe linings.

U.S. Patent No. 3,142,665 provides a process for the manufacture of paste-extrudable dispersion polymers in which, at least in the last part of the polymerization of tetrafluoroethylene, so-called modifying agents are present, for example hydrogen, methanol or a perfluoroalkene or perfluoroalkoxyalkene. The polymers obtained in this manner have good paste extrusion properties within a wide range of reduction ratios, which is the ratio, important in paste extrusion, of the cross sectional area of the preform to the cross sectional area of the die opening, and a reduced melt viscosity and the articles made therefrom have an improved transparency and a higher alternating bending strength, but, like the products of the former processes, they are distinguished by a series of drawbacks, especially with respect to their properties as insulating material for electric conductors. In the case of wires provided with a thin coating a relatively great number of punctures of the insulation indicate defects in the insulation, for example cracks. This number is multiplied or permanent disruptive discharges occur when the paste is extruded at a higher reduction ratio. Due to the fact that such defective section must be cut out of the insulated conductor, the faultless wirelength is shortened and a high percentage of waste is obtained. The number of punctures of the insulation is also increased when the so-called draw-off rate is increased. This means the quotient of the cross sectional area of the die opening (minus the cross section of the metallic conductor) and the cross sectional area of the unsintered insulation. In practice it is desirable to shift this draw-off rate towards higher values, if possible, since in this manner a coating can be obtained which has a much smoother surface and a higher gloss. In the whole range of draw-off rates not only the numbers of punctures of insulation is increased to a noteworthy extent with the products obtained according to the state of the art, with a distinctly increasing tendency towards a higher draw-off rate, but also a relatively favorable behavior in this respect is limited to a very narrow range of the draw-off rate. Hence, the manufacturer must operate under substantially constant conditions which is extremely difficult in practice.

Due to the diminished transparency of the products prepared with a seed dispersion the conductor insulation becomes turbid in many cases (the so-called chalking effect), which results in a brightening which is rather embarrassing with colored insulations.

It is the object of the present invention to provide a tetrafluoroethylene dispersion polymer having good paste extrusion properties and especially an improved suitability as insulation material for electric conductors.

The present invention therefore provides a process for the manufacture of modified tetrafluoroethylene dispersion polymers by polymerizing tetrafluoroethylene in the presence of the usual catalysts, dispersion agents and modifying agents and optionally anti-coagulants and optionally in the presence of an aqueous seed dispersion containing dispersed particles of polytetrafluoroethylene or of a copolymer consisting of at least 90% by weight of tetrafluoroethylene units, the balance being a fluoroolefinic compound, with subsequent coagulation and drying of the polymer obtained, which comprises carrying out the polymerization of tetrafluoroethylene in the presence of from 0.0005 to 1.5% by weight, calculated on the tetrafluoroethylene used without consideration of a possible seed dispersion, of a perfluorinated vinyl ether of the formula

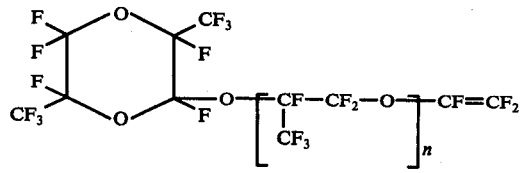

in which n stands for zero to 4, or of a mixture of any two or more of such perfluorinated vinyl ethers as modifying agent.

The invention further provides a modified tetrafluoroethylene dispersion polymer which has been prepared in accordance with the invention in the presence of from 0.0005 to 1.5% by weight, calculated on the tetrafluoroethylene used without consideration of a possible seed dispersion, of a perfluorinated vinyl ether of formula I in which n is zero to 4, or of a mixture of such perfluorinated vinyl ethers as modifying agent.

The perfluorinated vinyl ethers of formula I to be used as modifying agent in the process of the invention are prepared by reacting hexafluoropropene epoxide with a phosphoric acid tris-dialkylamide of the formula

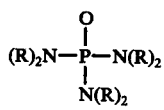

preferably phosphoric acid tris-dimethylamide, to obtain an acid fluoride of the formula

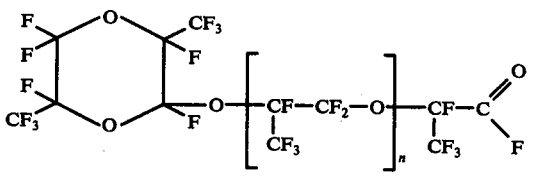

The acid fluorides of formula III are then hydrolyzed to the corresponding fluorocarboxylic acids which are neutralized with alkali. The carboxylic acid salts obtained are heated to a temperature above 150° C, whereby they are transformed by pyrolysis into the corresponding vinyl ethers of formula I. Syntheses of the aforesaid perfluorinated vinyl ethers of formula I are described in German Offenlegungsschriften No. 2,434,992 and 2,517,357. It is likewise possible to use mixtures of the aforesaid perfluorinated vinyl ethers of formula I in which n has different values. Preferred modifying agents are perfluorinated vinyl ethers of formula I in which n is zero or 1 or mixtures of the two compounds.

In the course of polymerization the modifying agent should be present in an amount of from 0.0005 to 1.5% by weight, preferably 0.01 to 1.0% by weight, calculated on the tetrafluoroethylene used without consideration of a possible seed dispersion, whether or not the dispersion polymerization is carried out in the presence of a seed dispersion. The modifying agent is preferably introduced into the reaction vessel prior to the beginning of polymerization, but it can be added as well in dosed quantities during the course of polymerization at any moment before a conversion of 70%, preferably 40%, is reached. Alternatively, part of the modifying agent can be first introduced into the polymerization vessel and the balance is then metered in during polymerization. Another possibility is to add the modifying agent from the beginning of polymerization, either continuously or in portions, until 70% and preferably 40% of the tetrafluoroethylene have reacted.

The dispersion polymerization is carried out under the usual pressures of from 5 to 30, preferably 8 to 16 atmospheres gauge and at temperatures of from 10° to 70° C, preferably 20° to 40° C, in the presence of the usual catalysts, preferably redox systems, i.e. combinations of a peroxidic compound, for example an organic or anorganic peroxide, a peracid, a persulfate, perborate, or percarbonate, with a reducing component, for example a bisulfite, thiosulfite, dithionite, hydrogen sulfite, sulfinate, or a compound yielding diimine, such as azodicarboxylic acid and the salts thereof, or azodicarbonamide. There are preferred combinations of alkali metal or ammonium persulfate with alkali metal bisulfites. In all cases it is absolutely indispensible that the catalyst used is soluble in water, especially in the alkaline range.

The dispersion polymerization of tetrafluoroethylene is also carried out in the presence of the usual emulsifiers, as described, for example, in U.S. Patent No. 2,559,752. There are mentioned by way of example the akali metal and ammonium salts of long chain perfluorocarboxylic acids, ω-hydroperfluorocarboxylic acids, chlorofluorocarboxylic acids, perfluorodicarboxylic acids, as well as perfluorosulfonic acids and perfluorophosphonic acids. Preferred emulsifiers in the process of the invention are the ammonium salts of perfluorooctanoic acid and of ω-hydroperfluoro-octanoic acid. If possible, the emulsifier used should not have telogenic properties. Optionally, the dispersion polymerization can also be carried out in the presence of small amounts (0.0001 to 0.01, preferably 0.0005 to 0.01% by weight, calculated on the weight of the aqueous mixture) of compounds having a regulating effect, which are used in addition to the aforesaid modifying agent, such as hydrogen, propene, chloroform, carbon tetrachloride or methanol. Further auxiliaries which may be present during polymerization are anticoagulants or dispersion stabilizers, for example long chain paraffin hydrocarbons, paraffin waxes, or so-called white oils which should be liquid under the polymerization conditions. As dispersion stabilizers there may also be used cyclic ethers, such as dioxane or tetrahydrofurane, polyoxalkylation products or the esters thereof, for example alkylphenol polyglycol ethers such as nonylphenyl polyglycol ether or triisobutylphenyl polyglycol ether, as well as polyglycol esters of fatty acids or polyoxakylation products of fatty amines. Stabilizing agents of this type are described, for example, in U.S. Patent No. 2,612,484 and in German Pat. No. 1,720,738. Further suitable dispersion stabilizers are polyalkylene glycols, for example diethylene, triethylene, dipropylene, tripropylene glycol or higher analogs thereof as well as mixed glycols of ethylene and propylene oxide. Polymerization is continued until the dispersion has a solids content of 10 to 40% by weight, preferably 15 to 30% by weight.

The dispersion polymerization of tetrafluoroethylene as described above in the presence of the modifying agent according to the invention can be carried out without the use of a seed dispersion. In a preferred mode of operation, however, the reactor is first charged with a seed dispersion of polyfluorotetraethylene or, more preferably, a seed dispersion of a copolymer of tetrafluoroethylene with a fluoroolefinic compound containing at least 90% by weight of tetrafluoroethylene units.

The seed dispersion can be prepared according to the usual methods of dispersion polymerization as described above from fluoroolefins with the aforesaid catalysts, emulsifiers and at the specified pressures and temperatures, however, without the use of the modifying agent. A seed dispersion of polytetrafluoroethylene must be stabilized by one of the aforesaid stabilizers, while a seed dispersion of one of the said copolymers may contain such a stabilizer. In principle, a copolymer seed is prepared as described above with the use of the following comonomers:

a. fluoroalkenes of the formula

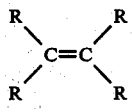

in which one of the radicals R represents fluorine, one or two of the radicals R are hydrogen, bromine, chlorine or iodine, and the remaining radical(s) R is fluorine, a perfluoroalkyl group or a perfluoroalkoxy group, the alkyl or alkoxy groups having from 1 to 4, preferably 1 to 2 carbon atoms in a branched or preferably straight chain, in the case of 2 radicals R standing for perfluoroalkyl or perfluoroalkoxy groups same may be identical or different;

b. perfluoroalkenes of the formula

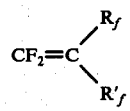

in which $R_f$ and $R'_f$ which may be identical or different, each represent a perfluorinated alkyl radical having from 1 to 4 and preferably from 1 to 2 carbon atoms, which is preferably linear or may be branched, preferably $CF_3$;

c. perfluro-(alkylvinyl) ethers of the formula $CF_2 = CF - OR_f$ in which $R_f$ represents a preferably linear or a branched perfluorinated alkyl radical having from 1 to 5 carbon atoms, preferably 1 to 3 carbon atoms;

d. perfluorinated vinyl ethers of the aforesaid formula I; or e. perfluoro-(2-methylene-4-methyl-1,3-dioxolane).

Besides the compounds listed sub *d*) and *e*) the following comonomers of groups *a*), *b*) and *c*) are mentioned by way of example: 1,2-difluoroethylene, 1,1- and 1,2-dichlorodifluoroethylene, 1,1- and 1,2-dibromodifluoroethylene, 1,1- and 1,2-diiododifluoroethylene, 1-chloro-1-bromodifluoroethylene, 1-choro-2-bromodifluoroethylene, trifluorobrmoethylene, trifluoroiodoethylene, 1-chloro-, 1-bromo- and 1-iodo-2,2-difluoroethylene, 1-chloro-, 1-bromo- and 1-iodo-1,2-difluoroethylene, 1H-pentafluoropropene(1), 2H-pentafluoropropene(1), 1,1H- and 1,2H-tetrafluoropropene(1), 1- and 2-chloropentafluoropropene(1), 1- and 2-bromopentafluoropropene(1), 1-iodopentafluoropropene(1), 1,1- and 1,2-chloro- or bromotetrafluoropropene(1), 1H- and 2H-heptafluorobutene(1), 1,1H- and 1,2H-hexafluorobutene(1), 2H-heptafluorobutene(2), 1H-heptafluoroisobutene(1), 1- and 2-chloropheptafluorobutene(1), 1-chloroheptafluoroisobutene(1), 1H- and 1-chlorononafluoropentene(1), trifluoromethyl- and pentafluoroethyl-1-fluoro-2,2-dichlorovinyl ethers, 1-trifluoromethyl- and 1-tetrafluoroethyl-(2,2-difluorovinyl) ethers, perfluorobutene(1) and -(2), perfluoroisobutene, perfluoropentene(1) and -(2), perfluoro-[2-methyl-butene(1)], -[2-methyl-butene(2)] and -[2-methyl-butene(3)], perfluoro-(methylvinyl), perfluoro-(ethylvinyl), perfluoro(butylvinyl), perfluoro-(isopropylvinyl) and perfluoro-(isobutylvinyl) ethers.

Besides perfluoro-(2-methylene- 4-methyl-1,3-dioxolane) mentioned above the following compounds are preferred as comonomers: trifluoroethylene, vinylidene fluoride, perfluoropropene, perfluoro-(propylvinyl) ether and especially trifluorochloroethylene. According to a preferred embodiment the perfluorinated vinyl ethers of formula I, especially those in which n stands for zero or 1 or mixtures thereof, which are used as modification agent in the main polymerization, are used as comonomer for the preparation of the seed copolymer in an amount of up to 10% by weight.

The proportion of the fluoroolefinic compound as comonomer in the copolymer seed, calculated on the copolymer as solid, should be in the range of from 0.1 to 10% by weight, preferably 0.3 to 5% by weight, the balance up to 100% consisting of tetrafluoroethylene units. It is likewise possible to use as comonomers two or more of the aforesaid fluoroolefinic compounds in the form of a mixture. The amount of tetrafluoroethylene used in the seed polymerization is chosen in such a manner that the seed dispersion obtained has a solids content of from 3 to 15, preferably 5 to 12% by weight.

The transition point of the crystalline phase of the solid copolymer seed is in the range of from 290° to 322° C, preferably 300° to 317° C. The seed dispersion predominantly contains spherical particles of uniform size having an average diameter of from 0.01 to 0.2, preferably 0.03 to 0.15 micron.

In the main polymerization according to the invention the seed dispersion described above is first introduced into the polymerization vessel in an amount such that the final solid dispersion polymer contains the solid seeds in an amount of from 0.5 to 15, preferably 4 to 12% by weight. The aqueous seed dispersion can be first introduced into the reaction vessel together with the aqueous solution of the catalyst and the other auxiliaries required for the main polymerization. The modification agent can be added either prior to polymerization or it can be metered in in the manner described above, and then the required amount of gaseous tetrafluoromethylene is forced in. Alternatively, the amount of catalyst necessary for the main polymerization and the other auxiliaries can be added to the seed polymerization, when the dispersion polymerization of the seed is terminated the pressure of the reaction vessel is then released for a short period of time whereupon polymerization is continued with the addition of tetrafluoroethylene and the modifying agent.

The dispersion polymerization of the seeds as well as the main polymerization are preferably carried out in an alkaline medium, i.e. at a pH of from about 5 to 8, preferably 5 to 7. For this purpose alkaline agents are added to the polymerization mixture, for example sodium or potassium hydroxide solution, preferably aqueous ammonia.

The modified polytetrafluoroethylene dispersions obtained by the process of the invention can be coagulated according to the usual and known methods, for example mechanically with the aid of a rapid stirrer, by spraying under pressure, or by the addition of acids or electrolytes. The moist powders obtained are dried at a temperature of from about 30° to 200° C, preferably 50° to 180° C in a stationary drying cabinet or a drying cabinet with air circulation. A low extrusion pressure of the paste is favored when the dispersion is dried at low temperature of from about 40° to 80° C according to the so-called fluidized bed technique.

The products obtained by the process of the invention have a series of surprisingly improved properties. Table I reveals that they are distinctly superior at low and high reduction ration with regard to the number of punctures of the insulation (disruptive discharges per 1000 meters of insulated conductor) and with regard to the transparency of the insulation. It should be mentioned that the comparative products are practically useless at the high reduction ratio of 2,400:1. Table II shows that the processing range with respect to the draw-off rate is considerably improved. While the product prepared in accordance with U.S. Pat. No. 3,142,665 yields satisfactory results practically only within a very small range ("Window") of the draw-off rate, the number of punctures of insulation of the product of the invention is reduced to the optimum within the whole range. At higher draw-off rates the quality of transparency is altered to a smaller extent. Quite generally, by increase of the draw-off rate the gloss and the smoothness of the surface are improved.

TABLE I

Number of disruptive discharges and transparency of coated conductors at different reduction ratios

| product | reduction ratio+ | draw-off rate++ | extrusion pressure atm. | punctures/ 1000 m | transparency of insulation |
|---|---|---|---|---|---|
| Example 16 (invention) | 1450 : 1 | 1.27 | 550 | 0 | 1 |
|  | 2400 : 1 | 1.275 | 770 | 3 | 1 - |
| U.S.Pat.No. 3,088,041 Ex. B | 1450 : 1 | 1.27 | 650 | 52 permanent discharge | 4 |
|  | 2400 : 1 | 1.275 | 720 | | 4–5 |
| U.S.Pat.No. 3,654,210 Ex. 27 | 1450 : 1 | 1.27 | 650 | 8 permanent discharge | 3 |
|  | 2400 : 1 | 1.275 | 800 | | 4–5 |
| U.S.Pat.No. 3,142,665 Ex. 17 | 1450 : 1 | 1.27 | 560 | 10 | 1 |
|  | 2400 : 1 | 1.275 | 770 | 62 | 1–2 |

+with the reduction ratio of 1450 : 1 the dis opening had a diameter of 1.47 mm and with the reduction ratio of 2400 : 1 the diameter was 1.244 mm. The reduction ratio in the extrusion of coated electric conductors means the ratio of cross sectional area of preform/ sectional area of die orifice-cross sectional area of conductor
++the draw-off rate is the quotient of the cross sectional area of the die orifice and the non-sintered insulation. When calculating the area of the die orifice the cross sectional area of the conductor is deducted.

The extrusion of electric conductors was carried out with a Jennings wire extruder of the type CEB 233-05 using a cable of 7 silver coated copper wires (silver coating 2 microns) according to American Wire Gauge Standards 22 having a total conductor diameter of 0.76 mm. As lubricant Shell special gasoline boiling in the range of from 100° to 125° C was used in a proportion of 18% by weight, calculated on the total mixture with the modified polytetrafluoroethylene dispersion polymer. The preform consisting of polymer and lubricant, which had been densified under a pressure of 100 bars, was inserted into the pressure cylinder of the wire extruder and the conductor was passed through the perforated mandrel, the wire guide and the die. The wire was then passed through a drying zone having a length of 4 meters to suction off the lubricant and through a sintering zone having a length of 6 meters and a temperature increasing from about 280° to 450° C. The coated wire was withdrawn by a draw-off device with varying draw-off rate. To increase the draw-off ratio the extrusion rate of the polymer was reduced by diminishing the advance of the piston (cf. Table II) with the wire speed of 15 m/min being constant. The increase in the draw-off rate results in a reduction of the thickness of the insulating layer and a diminution of the cable diameter. The value of the draw-off rate is obtained from the quotient of the cross sectional area of the die orifice (minus the conductor cross section) and the unsintered insulation. After having passed the draw-off means, the insulated conductor runs through the fault tracer and then to the wind-off device. As electrical fault tracer a disruptive discharge tester of Messrs. Richter (Debring near Bamberg, Federal Republic of Germany) of the type HT 1 was used. The test was carried out at 3.5 kilovolt according to VED Measuring Prescription 0472 and a frequency of 100 cycles per second. The numbers of punctures of the insulation per 1000 meters of coated conductor was recorded. With the draw-off ratio chosen in Table I the sintered insulation had a thickness of 250 microns, corresponding to a diameter of the sintered insulated conductor of 1.26 mm.

TABLE II

| product according to | draw-off ratio | disruptive discharges per 1000 meters | transparency of insulation |
|---|---|---|---|
| Example 16 of invention | 1.0 | 0 | 1 |
|  | 1.08 | 1 | 1 |
|  | 1.12 | 0 | 1 |
|  | 1.27 | 0 | 1 |
|  | 1.30 | 0 | 1 |
|  | 1.33 | 0 | 1 |
|  | 1.35 | 1 | 1 – 2 |
|  | 1.38 | 0 | – 2 |
|  | 1.42 | 0 | – 2 |
|  | 1.43 | 1 | 2 |
| U.S. Pat. No. 3,142,665 Example 17 | 1.1 | 3 | 1 |
|  | 1.15 | 5 | 1 |
|  | 1.17 | 6 | 1 |
|  | 1.19 | 1 | 1 |
|  | 1.22 | 4 | 1 |
|  | 1.25 | 2 | 1 – |
|  | 1.27 | 15 | 1 – |
|  | 1.30 | 12 | 1 – 2 |
|  | 1.32 | 16 | – 2 |
|  | 1.33 | 17 | 2 |
|  | 1.36 | permanent disrupture | 2 – 3 |
|  | 1.42 | permanent disrupture | – 3 |

In all cases the reduction ratio was 1450:1 (diameter of die orifice 1.47 mm) and the wire rate 15 meters per minute.

The quality of the transparency of the insulations obtained was evaluated in Tables, I, II, IV optically according to the following scale:
1. insulation absolutely clear, original color of metallic conductor shining through;
2. insulation slightly turbid, original color of metallic conductor no longer visible;
3. partly covered areas in insulation, metallic conductor still visible; generally increased turbidity;
4. over 50% of insulation in covered state, metallic conductor only partly visible;
5. insulation almost entirely covered, metallic conductor no longer visible.

The products obtained by the process of the invention can be processed with the use of a lubricant according to the paste extrusion process also into other types of profiles, for examples tubes, pipe linings, flexible tubes and the like. After removal of the lubricant by suction filtration the profiles are sintered in usual manner. Another mode of processing is the extrusion of profiles which are rolled to unsintered ribbons, for example with the aid of calander rolls. To obtain ribbons of reduced density they can be stretched and then freed from the lubricant by extraction, for example in a chlorohydrocarbon. Ribbons of this kind can be used as sealing material in armatures as for wound cable insulation. By sintering such products in the fixed state highly porous membranes can be produced.

To improve the mechanical properties of the modified tetrafluoroethylene polymers according to the invention or to reduce their friction resistance, they can be blended with the usual fillers. The fillers can be incorporated either into the dispersion or into the coagulated powders. They can be added in an amount up to 50% by weight, calculated on the total mixture, an amount of from 5 to 30% by weight being preferred. Suitable fillers are all types of non metallic and metallic, granular and fibrous, fillers such as, for example, glass fibers, asbestos, mica, graphite, carbon dioxide, silicium dioxide, or pulverulent metals such as copper, aluminum, silver or alloys, for example bronze or brass. The products of the invention can also be mixed with other auxiliaries, for example inorganic or organic pigments or dyestuffs, optical brighteners and the like, provided these auxiliaries are stable at the sintering temperature or the final products are to be used in the non-sintered state.

The filler containing products can also be used for making profiles such as tubes, flexible tubes, ribbons and the like, and for Bowden wires. Fillers, such as bismuth oxide, improve the contrast in radiography, for example in the case of catheter tubes. In the form of their aqueous dispersions, optionally after concentration, the modified polytetrafluoroethylene polymers can likewise be used for coating metallic surfaces or for impregnating porous articles, for example glass fiber or textile mats.

The examples listed in Table III (nos 1 to 27) are intenden to illustrate the manufacture of the products according to the invention. In Tables IV and V further properties of extruded tubes usch as punctures of insulation and transparency are summarized.

The products listed in Table III were polymerized under the following conditions:

1. Polymerization of seed polymer

An autoclave having a capacity of 400 liters with enamel inner coating and anchor stirrer was charged with a mixture consisting of 210 liters of desalted water, 5.3 cc of 2% by weight cupric sulfate solution and the amounts of emulsifier ($NH_4$ salt of perfluorooctanoic acid) and ammonia solution (18% by weight in water) as specified in column 2 of Table III, the autoclave was repeatedly flushed with nitrogen and, against a week current of tetrafluoroethylene, the amounts of comonomer specified in column 2 of the table (except Examples 26 and 27, in which pure polytetrafluoroethylene seed was used) were metered in in gaseous form. By adding tetrafluoroethylene the pressure was then increased to 14 atmospheres gauge and polymerization was started by adding 8 grams of sodium hydrogen sulfite and 7.7 grams of ammonium persulfate in the form of aqueous solutions and while stirring. The polymerization was performed at a temperature of 35° C until a solids content of 10% by weight had been reached.

2. Main polymerization

A 400 liter autoclave was charged with a mixture of 210 liters of desalted water, 184 g of the ammonium salt of perfluorooctanoic acid, 252 cc of ammonia (18% by weight in water), 5.3 cc of cupric sulfate solution (2% by weight) and the additives specified in column 3 of Table III. As seed dispersion the respective dispersion according to column 2 having a solids content of 10% by weight was used.

After having flushed several times with nitrogen, the pressure was increased to 14 atmospheres gauge by adding tetrafluoroethylene and simultaneously the amount of perfluorinated vinyl ther of formula I as indicated in column 3 of Table III was metered in. The mixture was heated to 28° C and polymerization was started by adding 9.5 g of sodium hydrogen sulfite and 14.7 grams of ammonium persulfate in the form of aqueous solutions and while stirring.

3. Processing

In an enameled vessel provided with MIG stirrer and baffles the dispersion obtained was diluted to a solids content of 10% by weight and coagulated by stirring at a temperature of 20° C. After having washed three times, each time with 150 liters of desalted water, the powder obtained was dried for 20 hours at 110° C.

TABLE III

| Ex. No. | seed polymerization | main polymerization | |
|---|---|---|---|
| 1 | 750 g $CF_2 = CFCl$ | 31.5 | kg seed dispersion |
|   | 152 g $CF_3(CF_2)_6COONH_4$ | 6.68 | g comp. I (n = 0) |
|   | 96 $cm^3$ $NH_3$ solution | 4.2 | g diethyleneglycol |
| 2 | 750 g $CF_2 = CFCl$ | 31.5 | kg seed dispersion |
|   | 152 g $CF_3(CF_2)_6COONH_4$ | 27.8 | g comp. I (n = 0) |
|   | 96 $cm^3$ $NH_3$ solution | 4.2 | g diethyleneglycol |
| 3 | 750 g $CF_2 = CFCl$ | 47.3 | kg seed dispersion |
|   | 152 g $CF_3(CF_2)_6COONH_4$ | 77.5 | g comp. I (n = 0) |
|   | 96 $cm^3$ $NH_3$ solution | 4.2 | g diethyleneglycol |
| 4 | 750 g $CF_2 = CFCl$ | 44.0 | kg seed dispersion |
|   | 152 g $CF_3(CF_2)_6COONH_4$ | 83.4 | g comp. I (n = 0) |
|   | 96 $cm^3$ $NH_3$ solution | 4.2 | g diethylenaglycol |
| 5 | 750 g $CF_2 = CFCl$ | 37.8 | kg seed dispersion |
|   | 152 g $CF_3(CF_2)_6COONH_4$ | 139 | g comp. I (n = 0) |
|   | 96 $cm^3$ $NH_3$ solution | 4.2 | g diethyleneglycol |
| 6 | 750 g $CF_2 = CFCl$ | 47.3 | kg seed dispersion |
|   | 152 g $CF_3(CF_2)_6COONH_4$ | 155 | g comp. I (n = 0) |
|   | 96 $cm^3$ $NH_3$solution | 4.2 | g diethyleneglycol |
| 7 | 750 g $CF_2 = CFCl$ | 37.8 | kg seed dispersion |
|   | 152 $g_3CF_3(CF_2)_6COONH_4$ | 166.8 | g comp. I (n = 0) |
|   | 96 $cm^3$ $NH_3$ solution | 0.42 | g diethyleneglycol, |
| 8 | 750 g $CF_2 = CFCl$ | 18,85 | kg seed dispersion |
|   | 152 g $CF_3(CF_2)_6COONH_4$ | 166,8 | g comp. I (n = O) |
|   | 96 $cm^3$ $NH_3$ solution | 0.42 | g diethyleneglycol |
| 9 | 750 g $CF_2 = CFCl$ | 37.8 | kg seed dispersion |
|   | 152 g $CF_3(CF_2)_6COONH_4$ | 166 | g comp. I (n = 0) |
|   | 96 $cm^3$ $NH_3$ solution | | |
| 10 | 750 g $CF_2 = CFCl$ | 37.8 | kg seed dispersion |
|   | 152 g $CF_3(CF_2)_6COONH_4$ | 278 | g comp. I (n = .0) |
|   | 96 $cm^3$ $NH_3$ solution | 4.2 | g diethyleneglycol |
| 11 | 750 g $CF_2 = CFCl$ | 37.8 | kg seed dispersion |
|   | 152 g $CF_3(CF_2)_6COONH_4$ | 556 | g comp. I (n = 0) |
|   | 96 $cm^3$ $NH_3$ solution | 4.2 | g diethyleneglycol |
| 12 | 750 g $CF_2 = CFCl$ | 37.8 | kg seed dispersion |
|   | 152 g $CF_3(CF_2)_6COONH_4$ | 77.8 | g comp. I (n = 0) |
|   | 96 $cm^3$ $NH_3$solution | 4.2 | g diethyleneglycol |
| 13 | 750 g $CF_2 = CFCl$ | 44.1 | kg seed dispersion |
|   | 152 g $CF_3(CF_2)_6COONH_4$ | 77.8 | g comp. I (n = 0) |
|   | 96 $cm^3$ $NH_3$ solution | 4.2 | g diethyleneglycol |
| 14 | 750 g $CF_2 = CFCl$ | 44.1 | kg seed dispersion |
|   | 152 g $CF_3(CF_2)_6COONH_4$ | 100 | g comp. I (n = 0) |
|   | 96 $cm^3$ $NH_3$ solution | 4.2 | g diethyleneglycol |
| 15 | 750 g $CF_2 = CFCl$ | 44.1 | kg seed dispersion |
|   | 152 g $CF_2(CF_2)_6COONH_4$ | 155 | g comp. I (N = 0) |
|   | 96 $cm^3$ $NH_3$ solution | 4.2 | g diethyleneglycol |
| 16 | 232 g $CF_2 = CFCl$ | 44.1 | kg seed dispersion |
|   | 184 g $CF_3(CF_2)_6COONH_4$ | 155 | g comp. I (n = 0) |

TABLE III-continued

| Ex. No. | seed polymerization | main polymerization | |
|---|---|---|---|
| 17 | 116 cm³ NH₃ solution<br>150 g CF₂ = CFCl<br>184 g CF₃(CF₂)₆COONH₄<br>116 cm³ NH₃ solution | 2.1<br>44.1<br>110<br>1.05 | g diethyleneglycol<br>kg seed dispersion<br>g comp. I (n = 0)<br>g diethyleneglycol |
| 18 | 150 g CF₂ = CFCl<br>184 g CF₃(CF₂)₆COONH₄<br>116 cm³ NH₃ solution | 44.1<br>55<br>2.1 | kg seed dispersion<br>g comp. I (n = 0)<br>g diethyleneglycol |
| 19 | 150 g CF₂ = CFCl<br>184 g CF₃(CF₂)₆COONH₄<br>116 cm³ NH₃ solution | 44.1<br>55<br>2.1 | kg seed dispersion<br>g comp. I (n = 0)<br>g diethyleneglycol |
| 20 | 150 g CF₂ = CFCl<br>184 g CF₃(CF₂)₆COONH₄<br>116 cm³ NH₃ solution | 44.1<br>110<br>2.1 | kg seed dispersion<br>g comp. I (n = 0)<br>g diethyleneglycol |
| 21 | 150 g CF₂ = CFCl<br>184 g CF₃(CF₂)₆COONH₄<br>116 cm³ NH₃ solution | 37.8<br>55<br>1.05 | kg seed dispersion<br>g comp. I (n = 0)<br>g diethyleneglycol |
| 22 | 150 g CF₂ = CFCl<br>184 g CF₃(CF₂)₆COONH₄<br>116 cm³ NH₃ solution | 44.1<br>155<br>2.1 | kg seed dispersion<br>g comp. I (n = 0)<br>g diethyleneglycol |
| 23 | 450 g CF₃(CF₂)₂OCF=CF₂<br>184 g CF₃(CF₂)₆COONH₄<br>116 cm³ NH₃ solution | 44.1<br>155<br>2.1 | kg seed dispersion<br>g comp. I (n = 0)<br>g diethyleneglycol |
| 24 | 350 g comp. I (n = 0)<br>184 g CF₃(CF₂)₆COONH₄<br>116 cm³ NH₃ solution | 37.8<br>110<br>2.1 | kg seed dispersion<br>g comp. I (n = 0)<br>g diethyleneglycol |
| 25 | 150 g CF₂ = CH₂<br>184 g CF₃(CF₂)₆COONH₄<br>116 cm³ NH₃ solution | 31.5<br>155<br>2.1 | kg seed dispersion<br>g comp. I (n = 0)<br>g diethyleneglycol |
| 26 | 184 g CF₃(CF₂)₆COONH₄<br>116 cm³ NH₃ solution<br>4,2 g dioxane | 44.1<br>155<br>2.1 | kg seed dispersion<br>g comp. I (n = 0)<br>g diethyleneglycol |
| 27 | 184 g CF₃(CF₂)₆COONH₄<br>116 cm³ NH₃ solution<br>4,2 g dioxane | 37.8<br>100<br>2.1 | kg seed dispersion<br>g comp. I (n = 0)<br>g diethyleneglycol |

TABLE IV

Further test results of wire extrusion

| Example No. | Extrusion pressure (bar) | transparency | disruptive discharges / 1000 m |
|---|---|---|---|
| 1 | 580 | 1 - | 3 |
| 2 | 575 | 1 - | 4 |
| 3 | 635 | 1 - | 2 |
| 5 | 610 | 1 - | 1 |
| 6 | 565 | 1 - | 2 |
| 10 | 580 | 1 - 2 | 2 |
| 11 | 600 | 1 | 2 |
| 13 | 530 | 1 | 0 |
| 15 | 560 | 1 - | 2 |
| 16 | 550 | 1 | 0 | reduction ratio 1450 : 1,
diameter of die orifice 1.47 mm,
draw-off ratio 1.27

TABLE V

Test results of hose extrusion (hose dimensions
outside diameter: 14.6 mm ; inside diameter: 13.3 mm
reduction ratio: 90 : 1)

| Example No. | tensile strength kp/cm² | | elongation at break +) % | |
|---|---|---|---|---|
| | longitudinal | transverse | longitudinal | transverse |
| 3 | 36.4 | 28.6 | 340 | 610 |
| 6 | 29.3 | 26.4 | 300 | 620 |
| 16 | 31.4 | 27.1 | 370 | 600 |

+) measured according to ASTM D 1457 - 69T

What is claimed is:

1. In a process for the manufacture of modified tetrafluoroethylene disperion polymers by polymerizing tetrafluoroethylene, subsequently coagulating and drying of the polymer obtained, the improvement comprises carryng out the polymerization of tetrafluoroethylene in the presence of a modifying agent comprising from 0.0005 to 1.5% by weight, calculated on the tetrafluoroethylene used, of a perfluorinated vinyl ether of the formula

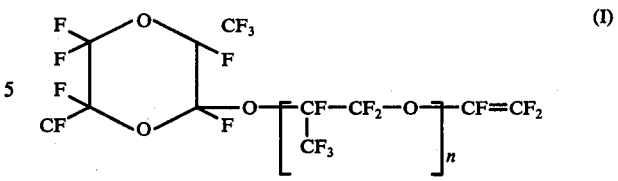

in which n stands for zero to 4, or of a mixture of any two or more of said perfluorinated vinyl ethers.

2. The process of claim 1, wherein the modified tetrafluoroethylene dispersion polymers are prepared in the presence of an aqueous seed dispersion comprising particles of polytetrafluoroethylene or of a copolymer comprising at least 90% by weight of tetrafluoroethylene units with the balance being units of another fluoroolefinic compound dispersed in water.

3. The process of claim 1, wherein the modifying agent is added at the beginning of polymerization.

4. The process of claim 2, wherein the modifying agent is added at the beginning of polymerization together with the seed dispersion.

5. The process of claim 1, wherein the modifying agent is added continuously or in portions during the period from the beginning of polymerization to a tetrafluoroethylene conversion of at most 70%.

6. The process of claim 2, wherein the particles of the seed dispersion consist of a copolymer of 90 to 99.9% by weight of tetrafluoroethylene units and 0.1 to 10% by weight of units of a fluoroolefinic compound.

7. The process as claimed in claim 2, wherein particles of pure polytetrafluoroethylene prepared in the presence of a dispersion stabilizer are used as seed polymer.

8. The process of claim 2, wherein the seed dispersion has a solids content of from 3 to 15% by weight.

9. The process of claim 2, wherein the seed dispersion is used in an amount corresponding to 0.5 to 15% by weight of solid seeds in the final polymer.

10. The process of claim 1, wherein the modifying agent is added during the course of polymerization at a time when up to 70% of the tetrafluoroethylene has been polymerized.

11. The process of claim 2 wherein the seed polymer contains as units of a fluoroolefinic compounds selected from the group consisting of a. fluoroalkenes of the formula

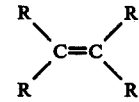

in which one of the radicals R represents fluorine, one or two of the radicals R are hydrogen, bromine, chlorine or iodine and the remaining radical(s) R are fluorine, a perfluoroalkyl group or a perfluoroalkoxy group, the alkyl or alkoxy groups having from 1 to 4;

b. perfluoroalkenes of the formulae

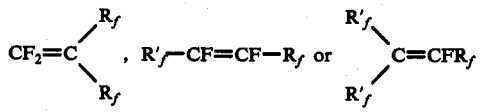

in which $R_f$ and $R'_f$, which may be identical or different, each represent a perfluorinated alkyl radical having from 1 to 4;

c. perfluoro-(alkylvinyl) ethers of the formula $CF_2=CF-OR_f$ in which $R_f$ represents a perfluorinated alkyl radical having from 1 to 5 carbon atoms;

d. perfluorinated vinyl ethers of the aforesaid formula I; and e. perfluoro-(2-methylene-4-methyl-1,3-dioxolane).

12. The modified tetrafluoroethylene dispersion polymer prepared by the process of claim 1.

13. Method of using modified tetrafluoroethylene dispersion polymers according to claim 12 for the manufacture of shaped articles which comprises extruding a paste of said polymers through a die.

* * * * *